United States Patent

[11] 3,614,194

[72] Inventor Clyde W. Harris
   Santa Barbara, Calif.
[21] Appl. No. 837,120
[22] Filed June 27, 1969
[45] Patented Oct. 19, 1971
[73] Assignee The Te Company
   Santa Barbara, Calif.

[54] WIDE FIELD OPTICAL SCANNER
   5 Claims, 4 Drawing Figs.

[52] U.S. Cl. ........................................ 350/7,
   178/7.6, 250/235, 350/175 SL, 350/175 VP,
   350/202, 350/286, 352/117
[51] Int. Cl. .......................................... G02b 17/00
[50] Field of Search ............................ 350/6, 7,
   285, 16, 22, 25, 26, 175 SL, 175 VP, 202; 178/7.6;
   250/235; 352/116, 117

[56] References Cited
   UNITED STATES PATENTS
   940,894  11/1909 Von Rohr .................... 350/22
   959,013  5/1910  Howell ......................... 350/7
   2,360,298 10/1944 Woodson ................... 350/286 X
   2,997,539 8/1961  Blackstone ................. 350/7 X
   3,099,748 7/1963  Weiss .......................... 350/7 X
   3,445,672 5/1969  Marks ......................... 250/219 PF
   2,402,216 6/1946  Vennigerholz ............. 350/175 UX
   2,769,367 11/1956 Schwesinger ............. 352/116
   2,896,504 7/1959  Schwesinger ............. 352/117
   3,235,660 2/1966  Treseder et al. .......... 178/7.6

FOREIGN PATENTS
   768,714   5/1934  France ........................ 352/117
   1,471,508 1/1967  France ........................ 350/202

Primary Examiner—David Schonberg
Assistant Examiner—John W. Leonard
Attorney—Charlton M. Lewis ABSTRACT: Raster scanning of a scene is produced by coaxial rotation of a ring of planoconvex refractive elements mounted with their convex faces in a common spherical surface. A complementary plano-concave window element is fixedly mounted just outward of the ring on the radial optical axis, compensating the convex curvature of the ring elements. The window and the adjacent ring element form a prism of variable angle, deflecting the optical axis in scansion in the plane of the ring. The scene is imaged by a thick optical lens fixedly mounted on the optical axis within the rotating ring, with plane entrance face closely adjacent the ring elements and with spherically convex exit face centered optically at the entrance face, which then acts as entrance pupil. The lens element has an integral totally reflective face which obliquely intersects the optical axis between entrance and exit faces, directing the axis along the axis of ring rotation. The spherical image surface can then accommodate an extended line of radiation sensors, providing an extended field in the plane perpendicular to the scanning plane.

PATENTED OCT 19 1971 3,614,194

INVENTOR.
CLYDE W. HARRIS,
By Charlton M. Lewis

WIDE FIELD OPTICAL SCANNER

This invention has to do with raster scanning of relatively large fields of view, and is particularly useful in the infrared region of the spectrum.

The invention typically utilizes a stationary linear array of light sensing elements, and provides optical means for cyclically sweeping an image of the field transversely of the sensing array. The optical scanning movement is typically horizontal, the length of the array effectively vertical.

Previously available optical scanning mechanisms are quite varied in their design, but suffer from corresponding disadvantages. In some the entrance pupil is immersed some distance back into the system, so that the external system "window" must be relatively large. Whether such a window is a flat plate or a spheroidal dome, the dimensions of the overall system are undesirably increased.

The use of reciprocating mirrors or other optical elements to achieve the scanning movement of the incident beam in many prior systems introduces mechanical complexity and the possibility of vibration. To achieve a raster scan, a relatively few detectors may work rapidly over the field, limiting the rate of repetition of a complete scan. On the other hand, use of a relatively extensive array of detectors implies optical imagery over a large instantaneous field, and this is hard to achieve in a suitable form. For example, concentric reflecting systems may achieve a wide field of view, but the image is awkwardly situated for mounting a detector array.

The present invention avoids those and other disadvantages of previously available scanning systems by employing a single rotary structure for cyclically deflecting the incident light in the scanning plane, and by utilizing refractive optics of Schmitt type for wide field image formation.

The present structure produces scanning action by effectively varying the angle of a prism in the path of incident light immediately ahead of the entrance pupil of the objective lens system. A ring of planoconvex lens elements essentially surrounds the objective, so that ring rotation causes the elements to swing successively across the incident beam. The convex faces of the ring elements are compensated by a fixed complementary planoconcave lens element, rendering the scanning optics essentially afocal. A somewhat similar ring structure has been proposed in U.S. Pat. No. 2,769,367 for laterally displacing an optical axis that passes diametrically across it, in order to compensate continuous movement of a motion picture film during projection. However, such lateral displacement of the optical axis without angular deviation cannot provide wide field scansion of a distant scene. The present invention produces such scansion by mounting the objective structure within the rotating ring, and permits scansion over a wide field by placing the entrance pupil of the objective immediately adjacent the ring elements.

The present invention provides an optical scanning system that is simple and compact both optically and mechanically. A large field of view is achievable in both plan and elevation. The entrance pupil of the optical system is close to the exterior window, permitting a small window to serve a relatively wide field.

A particular advantage of the present system results from the fact that raster scanning is achieved with only a single moving part which rotates continuously on a fixed axis.

A full understanding of the invention, and of its further objects and advantages, will be had from the following description of an illustrative manner of carrying it out, which description is to be read with reference to the accompanying drawings.

Figure 1:
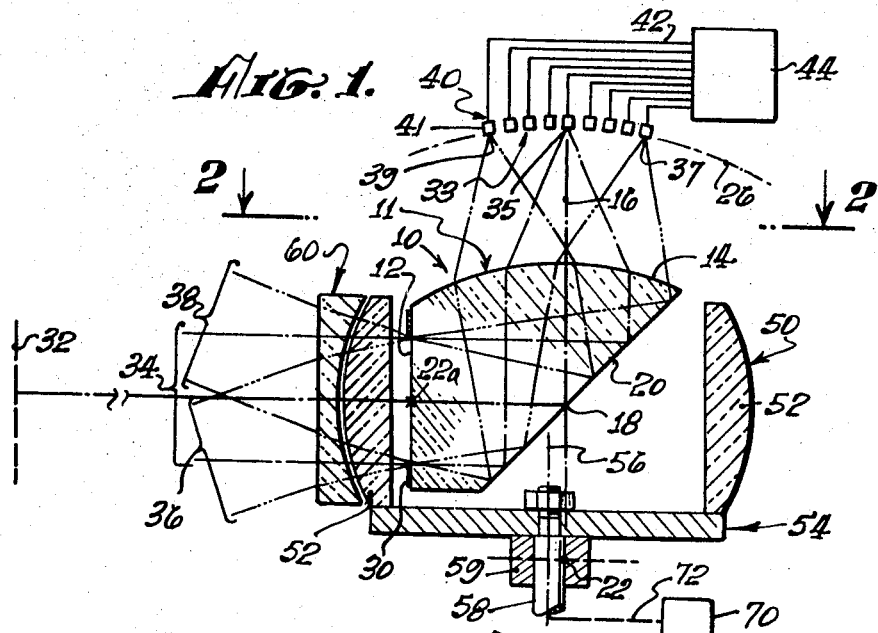
FIG. 1 is an axial section representing schematically an illustrative scanning system in accordance with the invention.

In the drawings the image forming portion of the system is indicated generally by the numeral 10 and typically comprises a single element 11 of refractive optical material having a plane entrance face 12 and a spherically convex exit face 14 arranged on the common optical axis 16. That axis is folded at 18 through an angle shown as 90° by the plane totally reflecting prism face 20, formed integrally with body 10. The center of curvature 22 of exit face 14 lies optically at 22a on axis 16 at, or closely adjacent, entrance face 12, forming a "refractive Schmidt" system. The principal focal surface of objective 10 is the spherical surface indicated at 26, which is concentric with exit face 14 and has a radius determined in known manner by the radius of that face and the index of refraction of element 11.

The effective aperture of entrance face 12 is limited by the aperture stop 30, which is mounted closely adjacent that face and may be supported directly on it. That aperture stop, being close to center of curvature 22a forms the entrance pupil of the system. Since the spherical refracting surface 14 and image surface 26 are both concentric about the coincident entrance pupil and aperture stop, there is no coma or astigmatism present, and the useful field of view is limited only by geometrical considerations. If desired, spherical aberration may be controlled by suitable figuring of entrance face 12, or by mounting an aspherical element on or directly in front of that face.

A distant object 32 to the left of the system as seen in FIG. 1, is imaged at 33 in surface 26, as indicated in FIG. 1 by the axial incident beam 34 and the typical oblique incident beams 36 and 38, which are focused at the respective object points 35, 37 and 39 in focal surface 26. Image 33 may be sensed in any desired manner, as, for example, by the array 40 of individual sensing elements 41, arranged in closely spaced linear formation on focal surface 26 in the plane of the drawing. Sensors 41 may comprise phototransducers of any suitable type having an electrical characteristic that is variable in response to incident electromagnetic radiation of the desired wavelength range. Such radiation, regardless of its wavelength, is referred to for convenience as "light" in this specification and claims. The sensors are connected electrically in conventional manner via the individual lines 42 to the control and utilization circuit indicated schematically at 44. Sensors 41 may be mounted with any desired mutual spacing, conforming to the effective angular definition that is required in the detection of scene 32. The length of array 40 similarly corresponds to the required angular field of view in the plane of FIG. 1.

For convenience of description, optical axis 16 to the left of prism face 20 as seen in FIG. 1 will be considered horizontal, with the axis portion between face 20 and focal surface 26 vertical. The linear extent of sensing array 40 then provides an extended angular field of view in the vertical plane.

An extended field of view in the horizontal plane is provided by optical scanning mechanism which comprises the ring structure 50, mounted for rotation about its axis of symmetry 56, and the fixedly mounted window element 60.

Figure 2:
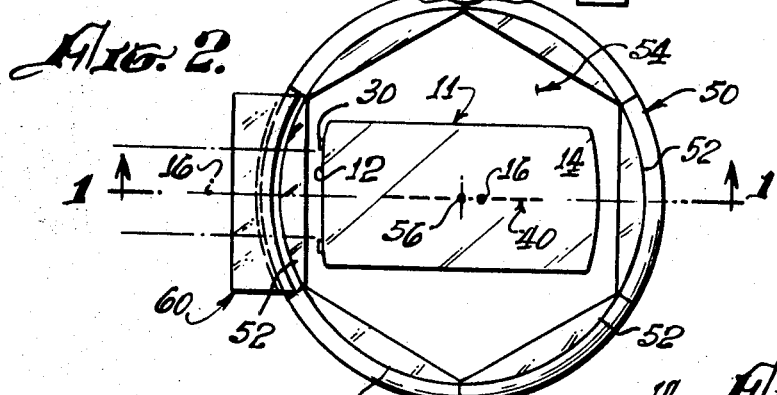
FIG. 2 is a section on line 2—2 of FIG. 1.
Figure 3:
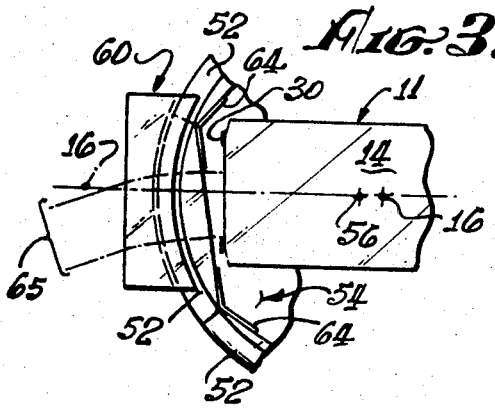
FIG. 3 is a fragmentary section corresponding to a portion of FIG. 2 and representing another position in the scanning cycle.

Ring 50 comprises the planoconvex refractive lens elements 52, mounted in a circle on a suitable support, shown schematically as the simple disc 54. The convex surfaces of elements 52 face radially outward. They are preferably spherically curved, as shown, and lie in a common spherical surface centered on ring axis 56. Cylindrically curved ring elements with their cylindrical axes parallel to ring axis 56 may be employed if preferred, but tend to introduce an axial type of astigmatism. The plane inner faces of elements 52, as seen from above in FIGS. 2 and 3, form a regular polygon. The number of elements is arbitrary, being shown illustratively as six.

Ring 50 is mounted for rotation about ring axis 56 by means of the shaft 58 and the bearing structure indicated at 59. Objective 10 and bearing structure 59 are mounted by suitable frame structure, not explicitly shown, in such relative positions that the ring of optical elements encircles objective element 11 with the incident portion of optical axis 16 extending radially with respect to ring axis 56 in the plane of the optical axes of the individual ring elements 52. The reflected portion of optical axis 16 is typically parallel to ring axis 56, and may coincide with it. Ring rotation causes ring elements 52 to pass closely in front of objective entrance face 12. The clearance between the ring and the rear portion of objective element 11 is arbitrary.

Window element 60 is a planoconcave spherical refractive lens with a curvature that is optically complementary with respect to the convex surfaces of ring elements 52. Element 60 is fixedly mounted on optical axis 16 immediately adjacent the outer face of the ring. As seen best in FIGS. 2 and 3, window element 60 and the adjacent ring element 52 than form essentially an afocal prism having a prism angle that varies in magnitude and sign in response to ring rotation, the prism working faces being parallel when the ring element is centered on axis 16 as in FIG. 2. As the ring rotates, the light beam delivered to imaging system 10 is received from a portion of scene 32 that varies cyclically over a definite scansion range.

The magnitude of angular scansion range depends upon the common index of refraction of ring elements 52 and window 60, and upon the angle subtended at axis 56 by the working portions of the inner faces of the ring elements. It is ordinarily preferred to blank the output signal during switchover from one ring element to the next. When the image is sensed electrically, as in the present illustrative system, such blanking is most easily done electronically, as by suitable gating of the transducer signals within circuitry 44. Alternatively, a suitably timed optical shutter may be provided, or the working area of each ring element may be masked, as indicated at 64 in FIG. 3. The effective duty cycle can be increased by designing the system so that the circumferential dimension of the ring elements is large compared to the width of the entrance pupil.

Drive mechanism 70 of any suitable type is coupled to shaft 58, as indicated schematically at 72, for driving ring 50 about its axis 56, typically at a constant speed selected in accordance with the desired rate of cyclic scan and the time constants of the sensors 41 and their associated circuitry. When all ring elements are identical, as so far described, the resulting optical scanning frequency corresponds to the ring rotation frequency multiplied by the number of elements 52 in the ring.

Figure 4:
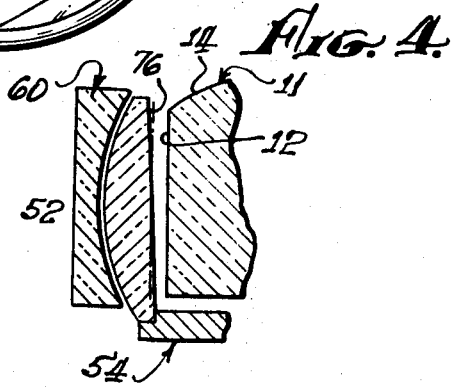
FIG. 4 is a fragmentary section corresponding to a portion of FIG. 1 and representing a modification.

The described system is particularly well adapted for providing an interlace scansion by which the intervals between sensors 41 are filled in during successive scansion movements of the beam. For that purpose the individual ring elements 52 may be mounted with their axes slightly offset to produce different amounts of vertical prism, as illustrated in exaggerated form for a typical ring element in FIG. 4, where the plane face 76 of ring element 52 is slightly inclined with respect to the vertical. The incident beam is thereby deflected upward or downward with respect to the plane of the ring, displacing image 33 in the focal surface 26 to the left or right as seen in FIG. 1. The strips of that image that fall between sensors during the cycle of scansion movement produced by one ring element is then detected during a successive cycle of movement. With six ring elements, as illustratively shown, either two-, three- or six-fold interlace is available.

The scanning mechanism of the present invention is especially effective with optical materials of high index of refraction and relatively low dispersion. For use in the infrared thermal region a particularly suitable medium is germanium. Although some chromatic compensation is possible optically, it is usually preferable to limit the chromatic aberration to an acceptable level by limiting the wavelength region of the effective radiation, as by use of selective filters, selective radiation sensors, or both.

Whereas the above description represents the presently preferred form of the invention, many modifications may be made without departing from the proper scope of the invention.

I claim:
1. Optical scanning mechanism, comprising in combination
   a scanning ring mounted for rotation about the ring axis and comprising a plurality of planoconvex refractive ring elements mounted in angularly offset mutual relation with
   a window having a substantially plane entrance face and a concave exit face that is substantially complementary with respect to the convex faces of the ring elements,
   optical objective means having an entrance pupil and a focal surface and comprising a body of refractive optical material having a generally plane entrance face and a spherically convex exit face with center of curvature substantially at the entrance face, and structure substantially in the plane of the entrance face and forming the entrance pupil,
   structure mounting the window and the objective means on a common optical axis that is radial with respect to the ring axis, with the concave face of the window closely spaced outwardly, and the entrance face of the body spaced inwardly, of the ring elements,
   means for sensing radiation at the focal surface of the objective means and comprising an array of radiation sensing elements mounted optically at the focal surface and mutually offset parallel to the plane common to the ring axis and the optical axis,
   and means for driving the ring in its said rotation relative to the window and the objective means to cause the sensing elements to receive radiation incident upon the window from respective directions that vary cyclically parallel to the plane of the ring and that are mutually offset angularly transversely of that plane.

2. Optical scanning mechanism as defined in claim 1, and in which
   said body of refractive material includes a plane, totally reflecting face intersecting the axis obliquely and folding the same through an angle of approximately 90° between the entrance face and the exit face, the entrance and exit portions of the optical axis defining an axis plane that is substantially parallel to said ring axis.

3. Optical scanning mechanism as defined in claim 1, and in which the entrance face of said body is figured to correct spherical aberration.

4. Optical scanning mechanism as defined in claim 1, and in which the plane faces of at least some of said ring elements are differently inclined with respect to the ring axis by a differential angle selected to cause differential displacement of images in the focal surface by less than the spacing between adjacent sensors.

5. Optical scanning mechanism comprising in combination
   a scanning ring mounted for rotation about the ring axis and comprising a plurality of spherically planoconvex refractive ring elements mounted in angularly offset mutual relation with their convex faces substantially centered on the ring axis,
   a window having a substantially spherically planoconcave exit face that is substantially complementary with respect to the convex faces of the ring elements,
   optical objective means having an entrance pupil and a focal surface,
   structure mounting the window and the objective means on a common optical axis that is radial with respect to the ring axis, with the concave face of the window closely spaced outwardly, and the objective means spaced inwardly, of the ring elements,
   means for sensing radiation at the focal surface of the objective means and comprising an array of radiation sensing element mounted optically at the focal surface and mutually offset parallel to the plane common to the ring axis and the optical axis,
   and means for driving the ring in its said rotation relative to the window and the objective means to cause the sensing elements to receive radiation incident upon the window from a direction that varies cyclically in the plane of the ring,
   the plane faces of said ring elements being differently inclined with respect to the ring axis by respective differential angles to cause differential displacement of images in the focal surface relative to the radiation sensing elements to cause effective scanning of the image